(12) United States Patent
Mihai

(10) Patent No.: US 7,613,862 B2
(45) Date of Patent: Nov. 3, 2009

(54) EMBEDDED DRIVER FOR BUS-CONNECTED DEVICE

(75) Inventor: Teodor R. Mihai, Limerick (IE)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 10/916,056

(22) Filed: Aug. 10, 2004

(65) Prior Publication Data
US 2006/0037015 A1    Feb. 16, 2006

(51) Int. Cl.
*G06F 13/10* (2006.01)
*G06F 9/44* (2006.01)

(52) U.S. Cl. ........................................ 710/300; 719/321

(58) Field of Classification Search ......... 710/300–304, 710/8, 62, 105; 719/321, 327
See application file for complete search history.

(56) References Cited

U.S. PATENT DOCUMENTS

| | | | | |
|---|---|---|---|---|
| 5,404,494 A | * | 4/1995 | Garney | 710/10 |
| 5,787,246 A | * | 7/1998 | Lichtman et al. | 709/220 |
| 5,935,228 A | * | 8/1999 | Shinomura | 710/302 |
| 6,189,050 B1 | * | 2/2001 | Sakarda | 710/18 |
| 6,671,749 B2 | * | 12/2003 | Williams et al. | 710/10 |
| 6,704,824 B1 | * | 3/2004 | Goodman | 710/300 |
| 6,842,797 B1 | * | 1/2005 | Lawande | 710/35 |
| 7,287,257 B2 | * | 10/2007 | Meza | 719/321 |
| 2004/0003135 A1 | * | 1/2004 | Moore | 709/321 |
| 2005/0132352 A1 | * | 6/2005 | Shen | 717/174 |

* cited by examiner

*Primary Examiner*—Mark Rinehart
*Assistant Examiner*—Trisha Vu
(74) *Attorney, Agent, or Firm*—Blakely, Sokoloff, Taylor & Zafman LLP

(57) ABSTRACT

A device including a storage component to store a driver for the device, and a device protocol handler to enable automatic upload of the driver to a storage subsystem of a processor based system in response to the device being communicatively coupled to a bus of the processor based system.

19 Claims, 3 Drawing Sheets

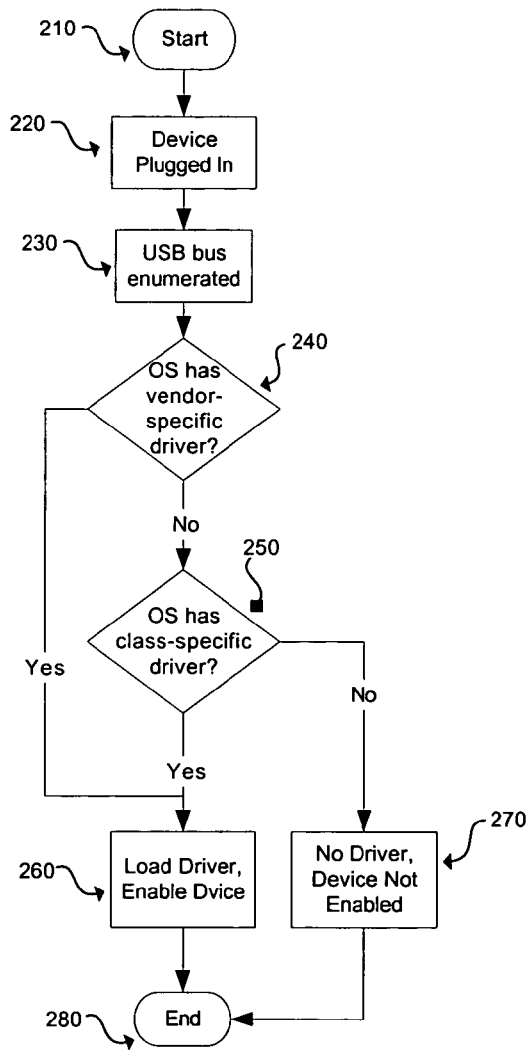
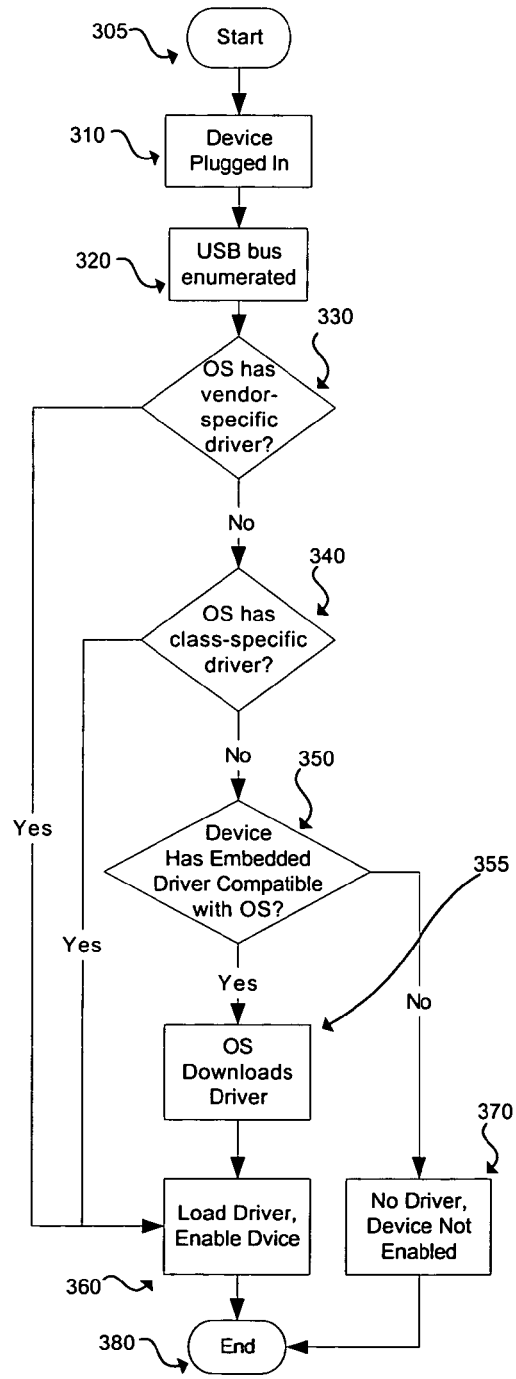
Figure 2
Figure 3

EMBEDDED DRIVER FOR BUS-CONNECTED DEVICE

BACKGROUND

External, removable devices may be attached to a personal desktop computer, laptop computer or other processor based system to provide additional functionality to the system. These devices may include, for example, keyboards, mice and other pointing devices, digital cameras, digital music players, storage devices such as disc readers and writers for the Digital Versatile Disc (DVD) format, and external amplified speaker systems, among many others. The Universal Serial Bus (USB) specification describes a bus and a set of protocols for such devices and their interaction with a computer system. *Universal Serial Bus Specification Revision* 2.0; *Universal Serial Bus Specification Revision* 1.1, USB Implementers' Forum.

In general, adding an internal or external device such as a removable DVD reader/writer could require a user to install a driver for the device in the operating system of the computer to which it is attached, and may in addition require that the system be shut down to physically connect the device without damage and further that the system be restarted after the installation of the driver, so that the operating system might recognize and enable the device. In contrast, in many instances, a USB compliant computer system such as a personal computer running a Microsoft Windows® XP operating system on an Intel Pentium® 4 processor based platform may automatically load drivers for a USB device in response to the device being connected to the computer system with a standard USB connector and allow immediate use of the device without requiring either a shutdown or a reboot to install the device or its driver.

This is possible in part because the USB Implementers' Forum has defined a set of standard device classes for which the Windows XP and other USB compliant operating systems are preconfigured with drivers. These device classes are described in an additional set of specifications called the device class specifications, such as for one example, the *Universal Serial Bus (USB) Device Class Definition for Human Interface Devices (HID)*, USB Implementers' Forum, which defines a class of devices including, among others, USB keyboards and mice. Whenever a USB device that belongs to a device class that has a class specification approved by the Forum is connected to a USB-compliant computer system, a device driver for the class of devices that is already stored as part of the operating system may be loaded using a standard device class interface for the device class, and allow the use of the USB device. As is well known, class specifications for many different device classes including Mass Storage Devices, Audio devices, Monitor devices, and others are defined by the USB Implementers' Forum.

The near-immediate usability of a USB device newly connected to a running system is further supported by the definition of the USB bus as hot pluggable, that is, the electrical characteristics of the bus and USB devices allow the dynamic connection and disconnection of the devices from a USB hub either on the computer's system board or external to it, without any damage to the computer system or the device in the normal course of operation. Thus, for instance, a USB compliant system that is powered on may be connected to a USB compliant DVD drive and a user may begin to use the drive in conjunction with the system, without any further intervention, after a short delay. Devices that are connected to a hot pluggable bus may also be termed hot pluggable or hot plugging devices.

BRIEF DESCRIPTION OF THE DRAWINGS

FIG. 2 is a flowchart depicting a high level view of processing in response to device connection in a USB compliant system.

FIG. 3 is a flowchart depicting a high level view of processing in response to device connection in one embodiment.

DETAILED DESCRIPTION

Figure 1:
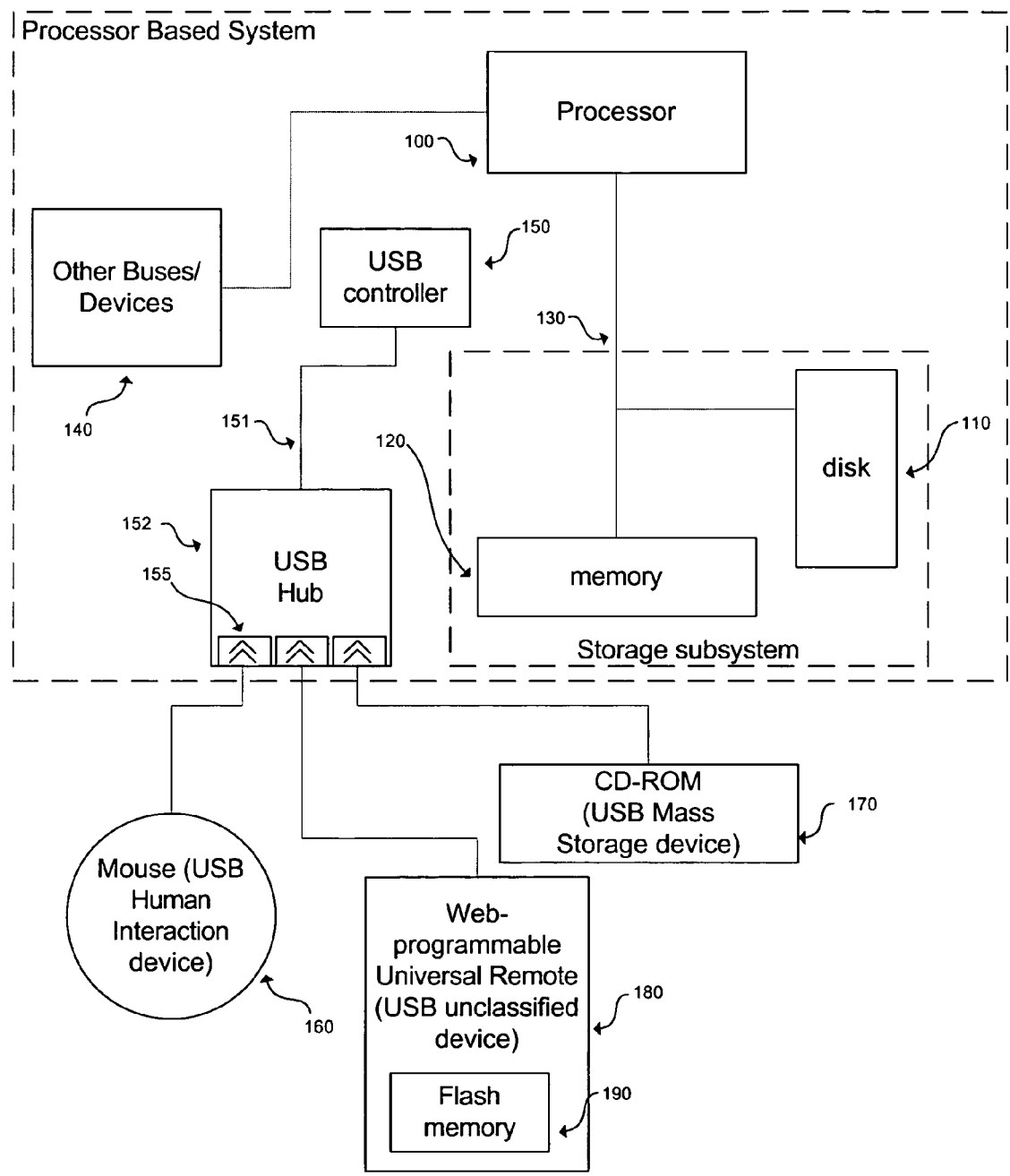
FIG. 1 represents a processor based system in one embodiment.

FIG. 1 depicts a processor based system in an embodiment of the invention. The processor based system may be a personal computer, either a laptop or a desktop; or a portable computing device such as a personal digital assistant, or even a cellular telephone, among others. In general, the depicted system has a processor 100 interconnected by a bus system 130 with a storage subsystem including a disk drive 110 and a memory 120. In some embodiments, the storage subsystem may consist entirely of solid state components, including non-volatile memory such as flash memory, and omit the disk drive altogether; in some embodiments, multiple disks may be present. Also interconnected with the processor is a USB controller 150 which supervises the operation of a Universal Serial Bus 151. Coupled to the bus is a hub 152 which provides connection sockets 155 to which USB devices may be connected. Other peripherals and buses 140 may also be interconnected to the processor or to the processor's primary bus system. The system may be managed in part by an operating system or OS that executes on the processor and is resident in the storage subsystem.

The USB devices 160, 170 and 180 connected to the USB hub are exemplary. In this example, the devices are a mouse or similar Human Interaction Device (HID) in the HID device class 160, and a CDROM reader or similar device in the Mass Storage Device class 170. A device that does not belong in any of the approved device classes such as a web-programmable universal consumer-entertainment remote controller or another hitherto unclassified device 180 may also be connected to the hub.

In many instances, a USB device attached to the hub may itself contain a storage component such as a flash memory component 190, depicted in this example as part of the device 180. In general, other devices may also include storage components.

As would be clear to one in the art, the configuration of the USB hub and devices depicted is one of a very large number of variations possible. For instance, a secondary hub similar in function to the system hub 152 may itself be connected as an external USB device. Hubs may be also be connected to each other in a hierarchical manner with the system USB hub as the root, as is known in the art, allowing a large number of devices of different or similar types to be connected to the processor based system.

In FIG. 2, a flowchart depicts, at a high level, the processing that occurs in a system such as that depicted in FIG. 1 when the processing is in accordance with a standard USB compliant protocol, executed by the USB controller in FIG. 1 at 150 and in addition by an operating system in some instances. In FIG. 3, processing that occurs in a system such as the one in FIG. 1, when the controller executes protocols in accordance with an embodiment, is depicted.

First considering FIG. 2, processing begins 210 in response to a USB to a device being plugged in to a USB hub of the system at 220 with a standard process of USB bus enumeration, 230. During enumeration, the system identifies and provides unique addresses for the USB devices connected to it, and the device communicates its device class, if any, to the system. If a device is detected matching a vendor-specific driver for the device available in a store of drivers that the OS has available, 240, the driver is loaded and the device enabled, 260. If, however a vendor specific driver is not found, the OS checks if it has a driver for the USB device class that was identified to the system by the device, 250. If, however, no class specific driver is found either, then in the current implementation of USB, the device cannot be enabled unless a user or other agent intervenes to provide a driver.

In FIG. 3, a flowchart depicts processing in one embodiment. As before, processing begins 305 once a device is plugged in to a USB connector or socket, 310; first, the bus is enumerated, 320, and then the OS checks for a vendor specific driver 330 and next for a class specific driver 340. However, if the OS fails to find a driver, the system checks at 350 if the device is a member of a class of devices that provide drivers for themselves embedded in onboard memory—a new class that is not currently defined as part of the USB Device Class Specifications. If that is the case, the system may now download a driver package from the device that is compatible with the OS and the processor based system from the memory of the device at 355, and the OS may then load the driver and enable the device, 360. If a device has neither driver support available to the OS nor an embedded driver, the device in this case cannot be enabled without intervention, 370.

Many variations of the processing described above are possible. First, the device bus on which the processing is based may be any bus that allows a system and a connectible device to execute a protocol sufficient for a device to identify itself as a member of a class of devices and to transfer data from the device to the OS on request. Thus the bus and connector need not in general be a USB bus or a USB connector. Furthermore, the actual execution of the protocol may vary in different embodiments. In one specific instance, processing may omit some of the checks depicted above in FIG. 3, for example, an OS may not check for vendor specific drivers or check for a device class specific driver, and go directly to the processing related to download of an embedded driver. In other embodiments, the OS may require some user intervention either to download the driver from the device, to install it, or to enable the device. In other embodiments, security protocols may have to execute in addition to the download processing of FIG. 3 to ensure that harmful code is not downloaded into the system.

To enable processing as in the embodiment as shown in FIG. 3, a new device class is defined in this embodiment in a manner analogous to other standard device classes in the USB Device Class Specifications. (The new device class is not a part of the current USB Device Class Specifications). This new device class includes those devices, like the one depicted at 180 in FIG. 1, that incorporate stored or embedded drivers that are available in each case from the device itself and are stored in a storage component in the device such as in a flash memory. Such a class of devices would have a new standard interface number, analogous to the other device class interfaces for the existing device classes.

Figure 4:
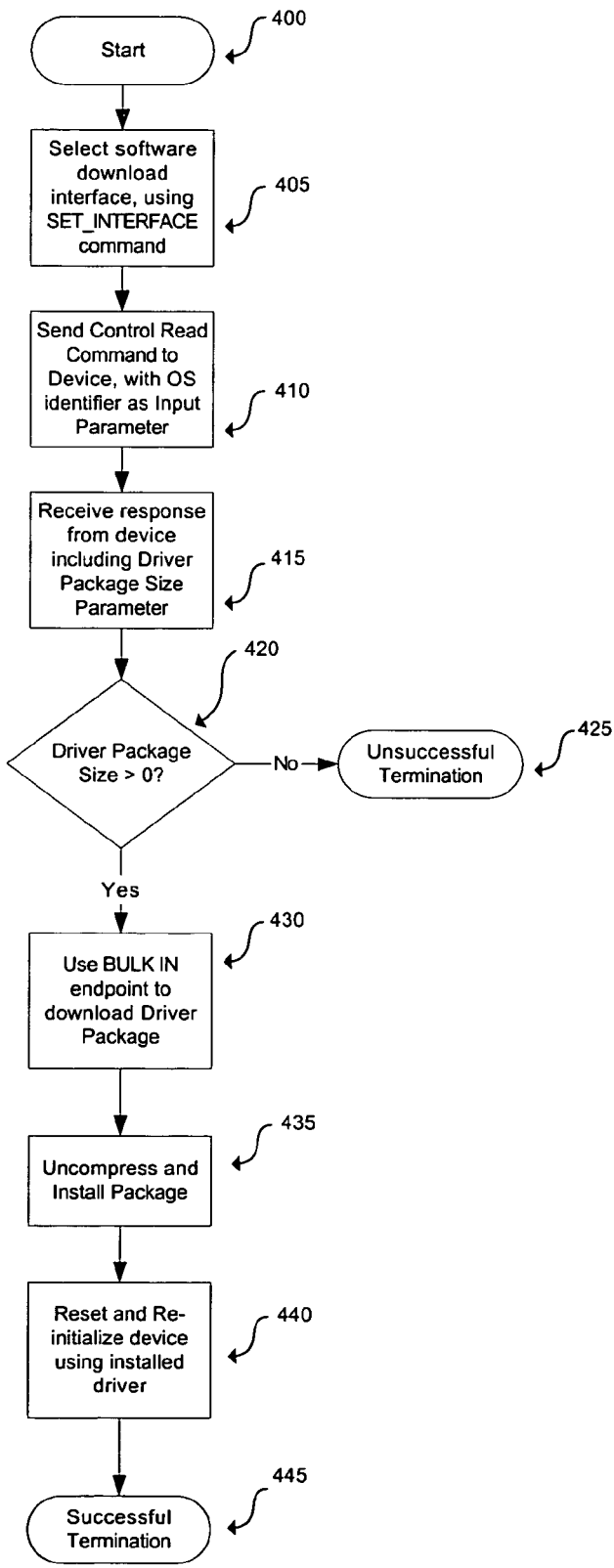
FIG. 4 is a flowchart depicting a high level view of processing of embedded software download in one embodiment.

In FIG. 4, the system processing for driver download from such a device (FIG. 3, blocks 350 and 355) is further explicated. In FIG. 4, processing begins 400 after the OS and the bus controller have identified that a device connected to the USB bus is a device with an interface in the newly defined device class of embedded drivers that has been discussed above. The system then selects the specific predetermined interface for this class using a USB SET_INTERFACE command, 405, as is known in the art. In the next block, 410, the system sends a USB Control Read command to the device, with a parameter uniquely identifying the OS and the platform on which the OS is executing. On receiving the Control Read command, the device searches for and may either find a matching driver, in which case it sends a response including the size of the driver package to be downloaded, or it may not, in which case the device sends a response including a driver package size set to zero. Once again, such processing is not defined as a part of the existing USB Specification. The system receives the response at 415 and determines from the driver package size at 420 whether a compatible driver is available on the device, by checking if the driver size is greater than zero. If the driver is unavailable, processing terminates unsuccessfully, 425. If it is available, the system uses a BULK IN data transfer using an endpoint of the USB device, as is known in the art, to download the driver package from the device to the system, 430. The driver may be stored in many different formats in the storage component of the device, including for one example, the Windows Cabinet (CAB) format. Once the package has been downloaded, it may be verified and decompressed as necessary, 435 and then installed. The system may then re-initialize the device to enable its use with the newly installed driver.

As before, many variations of the USB-based process described in FIG. 4 are possible. A similar protocol may be constructed for other USB-like buses having the characteristics of a basic protocol to identify a device to a system, and the ability to transfer data by request between devices and the connected system. Moreover, the protocol used in this embodiment as depicted in FIG. 4 by the system and the device to decide whether a compatible driver is available may differ from the one used in the flowchart of FIG. 4. For one example, a device may send a specific code to indicate that a matching driver is found instead of a non-zero package size as in FIG. 4; in another instance, the device may send a string identifying the OS compatible with each of the drivers stored on the storage component to the system and the system may then determine compatibility. Many other variations of the protocol are possible as is known in the art. The driver itself may not be compressed, or a different compression method may be used, including for one example a ZIP format. As before, some or all actions described may be subject to security protocols and require some user authentication or intervention for their completion.

While certain exemplary embodiments have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments or some of their features in hardware, programmable devices, firmware, software or a combination thereof.

Embodiments may be provided as a computer program product that may include a machine-readable storage medium having stored thereon data which when accessed by a machine may cause the machine to perform a process according to the claimed subject matter. The machine-readable storage medium includes floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. An apparatus comprising:
    a storage component of a computer system to store a driver for a device on the computer system, the computer system further having a processor and a storage medium coupled with the processor via a bus; and
    a protocol handler in communication with the storage component, the protocol handler to
        determine whether the device belongs to a specific vendor and is compatible with a particular operating system, and enable automatic download of the driver to a storage subsystem of a computer system in response to the device belonging to the specific vendor and compatible with the particular operating system,
        determine whether the device is identified as belonging to a specific class of devices and is compatible with the particular operating system if the device belonging to the specific vendor is not detected, and enable automatic download of the driver belonging to the specific class and the particular operating system, the specific class including a new device class corresponding to a new device having a new standard interface number and being analogous to device class interfaces associated with existing devices classes, the device to receive a command, and upon receiving the command, the device to search for a matching driver and to respond with a driver package size, wherein the driver package size is set to zero if the matching driver is not found, and
        determine whether an operating system has an embedded driver compatible with the particular operation system if the driver belonging to the specific vendor and class is not detected, and enable automatic download of the embedded driver.

2. The apparatus of claim 1 wherein the device further comprises a connector to communicatively couple the device to the bus of the computer system and wherein the protocol handler is further to establish communication with the computer system over the bus.

3. The apparatus of claim 2 wherein the protocol handler is further to automatically establish communication with the device over the bus and to enable automatic download of the driver to the storage subsystem of the computer system.

4. The apparatus of claim 3 wherein the protocol handler is further to identify the device as a member of a predetermined interface class, and the protocol handler is further to interact with devices in the predetermined interface class.

5. The apparatus of claim 4 wherein the bus further comprises a serial bus with hot-plugging capability.

6. The apparatus of claim 5 wherein the bus further comprises a bus compliant with a Universal Serial Bus (USB) protocol.

7. The apparatus of claim 6 wherein the predetermined interface class comprises USB devices with embedded drivers.

8. A method comprising:
    storing a driver for a device on a storage component of the device on the computer system, the computer system further having a processor and a storage medium coupled with the processor via a bus;
    determining whether the device belongs to a specific vendor and is compatible with a particular operating system, and enabling automatic download of the driver to a storage subsystem of a computer system in response to the device belonging to the specific vendor and compatible with the particular operating system;
    determining whether the device is identified as belonging to a specific class of devices and is compatible with the particular operating system if the device belonging to the specific vendor is not detected, and enabling automatic download of the driver belonging to the specific class and the particular operating system, the specific class including a new device class corresponding to a new device having a new standard interface number and being analogous to device class interfaces associated with existing devices classes, the device to receive a command, and upon receiving the command, the device to search for a matching driver and to respond with a driver package size, wherein the driver package size is set to zero if the matching driver is not found; and
    determining whether an operating system has an embedded driver compatible with the particular operation system if the driver belonging to the specific vendor and class is not detected, and enabling automatic download of the embedded driver.

9. The method of claim 8 further comprising establishing communication with the device over the bus and to enable download of the driver to the storage subsystem of the computer system.

10. The method of claim 9 further comprising identifying the device as a member of a predetermined interface class, and interacting with devices in the predetermined interface class.

11. The method of claim 10 wherein the bus further comprises a serial bus with hot-plugging capability.

12. The method of claim 11 wherein the bus further comprises a bus compliant with a Universal Serial Bus (USB) protocol.

13. The method of claim 12 wherein the predetermined interface class comprises USB devices with embedded drivers.

14. A machine-readable storage medium comprising instructions which, when executed, further cause a machine to:
    store a driver for a device on a storage component of the device on the computer system, the computer system further having a processor and a storage medium coupled with the processor via a bus;
    determine whether the device belongs to a specific vendor and is compatible with a particular operating system, and enable automatic download of the driver to a storage subsystem of a computer system in response to the device belonging to the specific vendor and compatible with the particular operating system, and
    determine whether the device is identified as belonging to a specific class of devices and is compatible with the particular operating system if the device belonging to the specific vendor is not detected, and enable automatic download of the driver belonging to the specific class and the particular operating system, the specific class including a new device class corresponding to a new device having a new standard interface number and being analogous to device class interfaces associated with existing devices classes, the device to receive a command, and upon receiving the command, the device to search for a matching driver and to respond with a driver package size, wherein the driver package size is set to zero if the matching driver is not found; and determine whether an operating system has an embedded driver compatible with the particular operation system if the driver belonging to the specific vendor and class is not detected, and enable automatic download of the embedded driver.

15. The machine-readable storage medium of claim 14 wherein the instructions when executed further cause the machine to establish communication with the device over the bus and to enable download of the driver to the storage subsystem of the computer system.

16. The machine-readable storage medium of claim 15 wherein the instructions when executed further cause the machine to identify the device as a member of a predetermined interface class, and to interact with devices in the predetermined interface class.

17. The machine-readable storage medium of claim 16 wherein the bus further comprises a serial bus with hot-plugging capability.

18. The machine-readable storage medium of claim 17 wherein the bus further comprises a bus compliant with a Universal Serial Bus (USB) protocol.

19. The machine-readable storage medium of claim 18 wherein the predetermined interface class comprises USB devices with embedded drivers.

* * * * *